United States Patent [19]

De Facci et al.

[11] 4,278,864
[45] Jul. 14, 1981

[54] WELDING GAS SHIELD CONTROL

[76] Inventors: Claude De Facci, 22536 Lake Shore Dr., Richton Park, Ill. 60471; Peter C. Duerr, 4757 W. 175th Pl., Country Club Hills, Ill. 60477

[21] Appl. No.: 13,024

[22] Filed: Feb. 21, 1979

[51] Int. Cl.³ .......................... B23K 9/16; B23K 9/32
[52] U.S. Cl. ..................................... 219/75; 219/74; 219/137.63; 73/199
[58] Field of Search ............... 219/72, 74, 75, 137.63; 73/199; 137/883

[56] References Cited

U.S. PATENT DOCUMENTS

| 2,194,420 | 3/1940 | Deming | 73/199 X |
| 3,578,939 | 5/1971 | Green | 219/72 X |
| 3,601,578 | 8/1971 | Gebel et al. | 219/75 X |
| 3,808,397 | 4/1974 | Wixson | 219/74 X |
| 4,174,733 | 11/1979 | Eidsmore et al. | 73/199 X |

Primary Examiner—Arthur T. Grimley
Assistant Examiner—Keith E. George
Attorney, Agent, or Firm—Sixbey, Friedman & Leedom

[57] ABSTRACT

An inert gas is supplied in a conduit system at a pressure high enough to provide a desired shielding gas volume at each and all arc welding sites spread over a substantial work area and each welder is responsible for the performance of a lightweight, readily portable, security protected, fixed pressure output regulator of high accuracy preferably having a pressure gauge and two independent visible output flow meters and flow valves easily adjusted separately to provide proper shielding at the front and back of a weld simultaneously, but independently, under the personal control of each welder at each welding site with excellent mobility regardless of floor elevation, for an acceptable and individualized responsibility for each certified weld performed.

8 Claims, 4 Drawing Figures

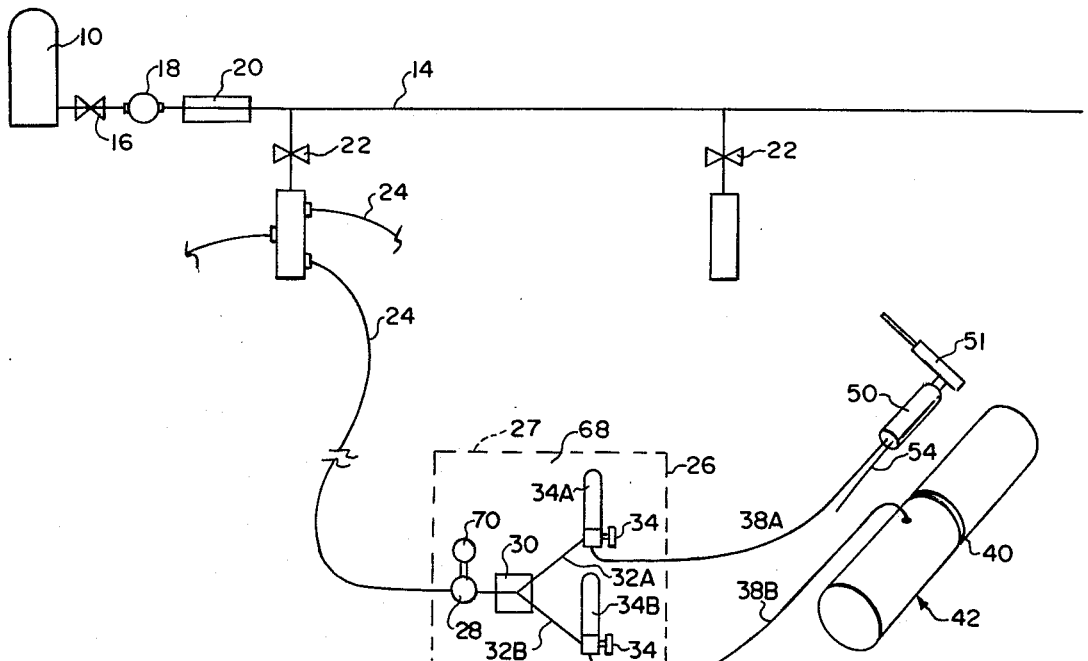
FIG. 1
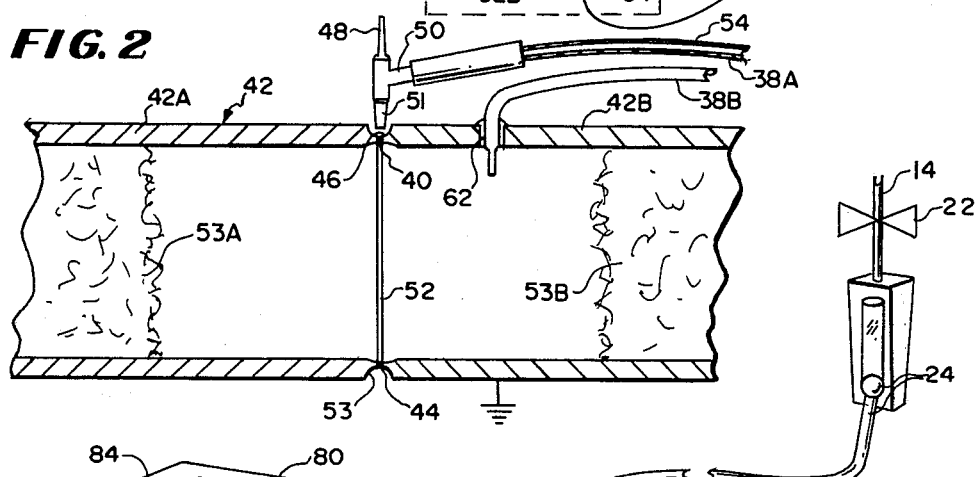
FIG. 2
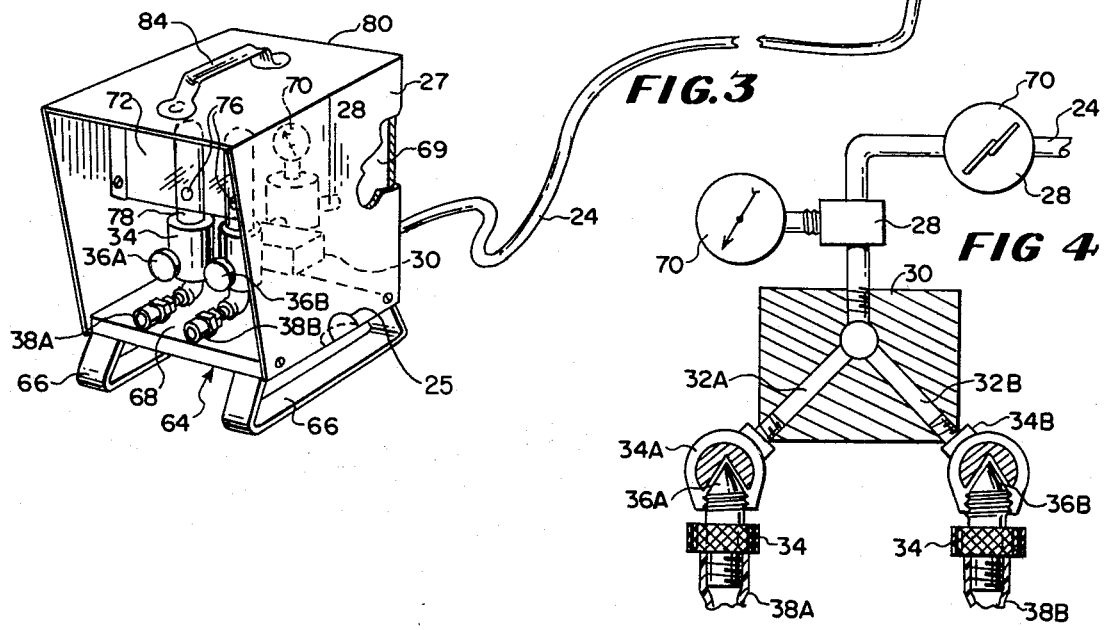
FIG. 3
FIG 4

WELDING GAS SHIELD CONTROL

BACKGROUND OF THE INVENTION

For satisfactory results in gas tungsten arc welding, (GTAW), it is necessary, and required, that certain volumes of inert gas such as argon or helium be maintained as an atmosphere for shielding both sides of each G.T.A. weld while it is being made. Too much or too little shielding gas, within comparatively close limits, involves a rejection for a defectiveness which entails a complete rewelding and rechecking sequence.

Moreover, although conventional equipment presently employed is certifiable generally, adjustability and pressure variations occur in the supply of shielding gas and there may be no certainty as to the cause why defective welds occur. Some causes may be direct and others indirect.

The pressure and flow in conventional pressure controlled manifold supply systems constantly varies with an irregular number of welds being shielded at a given time. The flow volume through a service stage regulator which has a low pressure output can drop enough to affect the welds adversely, while too much flow also causes problems as well as wastes expensive gas.

Furthermore, under present practice, the gas supply flow is variable depending upon the number of welds being made at a given time in manufacture or repair operations at widely spaced sites, and the flow capability in a manifold supply system varies continuously along with the stored pressure supply volume of the tanks and the distance of flow from the manifold regulator and frictional flow through conduits, particularly flexing hoses of different lengths.

More often than not, an individual welder is logically and primarily blamed for a bad weld, for any one of several reasons, some of which may be beyond his control, and he in turn blames his equipment, unless several welds by different welders happen to be rejected. Then the shielding gas supply equipment is blamed even though it may only have been temporarily overloaded, but, by this time many poor welds are involved that require correction at substantial cost and production delays.

To avoid this, to save time, improve results and pin point difficulties and responsibility, both the flow rate and pressure of the shielding gas supply must be closely controlled knowingly, and mobile welding equipment perfected for constancy and uniformity of welds regardless of distance of use from the source of pressurized gas supply, not only for the benefit of the performance record of the welder, the company and the equipment, but particularly for the avoidance of reworking rejects and the waste of gas that occurs either way.

OBJECTS OF THE INVENTION

A primary object of the invention is to supply, economically and with continuous accuracy, certifiable at any time, at each and every arc welding site, readily determined amounts of shielding gas required for shielding opposite sides of each and every GTA weld whereby everyone concerned, supervisors and welders alike, can determine each weld and welding operation, with the continuing ability to correct immediately at the welding site any discrepancy that may be detectable for assuredly providing a certifiable factually correct welding record indicating that proper welds are and have been made and thereby avoid any need for redoing any certifiable weld regardless of when and where the weld might be used or rechecked.

One of the objects of the invention is to simplify the implementation and maintenance of a calibration program for flowmeters used in Argon gas distribution systems under the rules and jurisdiction of existing welding codes, such as ASME Section III, requiring measuring the equipment against National Standards and then protecting them against undetectable tampering.

Another object of the invention is to provide easy, simple, inexpensive and accurate equipment and method for G.T.A. welding which assures compliance with National Standards.

A further object is for the easy checking and recalibration of equipment, and when an inspector's seal is broken, the method of easily tracing the use of the unit to the welder and to the welds involved and for an exhaustive check out of all calibrated components present in such unit that are necessary for or involved in the calibration required for providing a certifiable weld, and, to determine the nature of the defectiveness involved.

In the present invention only one pressure regulation is used in the piping system and this is at its main supply inlet. No second stage regulators or flow control devices are required at the fixed station drops so that conduits connected thereto can vary desirably in length and smallness in size to avoid cluttering up welding floor areas with heavy hose sizes even though various inherent pressure drops might be present at their outlet ends and varying amounts of weld atmosphere shielding may be concerned, yet this simplification can be used with existing systems with improved results to provide great flexibility and mobility to supply each welder at a work site with adequate shielding gas without significant pressure drops.

Another object of the invention is to deliver through two assured short lengths of flexible hose the exactly proportioned amounts of shielding gas required on opposite sides of individual welds to eliminate the confusion, variability and vagrant changes in flow rates and pressures conventionally involved with intermittant welding operations at multiple and different sites including flow pressure changes due to different flow distances and numbers of simultaneous uses in different supply conduits.

A further object and advantage along with the use of only one pressure regulator to supply an adequate quantity and pressure in the main supply manifold piping to enable a final stage regulation at each weld site that can be under constant surveillance of each welder for assured and certifiable constancy of pressure flow and gas volume at each welding site. Such is not affected by pressure changes within the first stage pressure limits of 40–300 p.s.i.g. on the distribution system. This, along with an individually adjustable volume flow and flow indication control, not only provides the correct amounts of shielding gas at each weld, but thereby economizes on equipment and gas for the best results according to a certification practice which can be most effective. Furthermore, it is practical and acceptable to individual welders when each one is clearly responsible individually for the particular operative results of certified equipment they control, and, for reasonable cause, each can request a redcheck certification which is quick, time saving, and accurate.

Another object of the invention is to provide an adequate and proper volume flow control of shielding gas at each and every welding site which can be calibrated and certified at the side by instrumented constant volume flow and pressure controlled at each site as the individuallized responsibility of the welder or the equipment supervisor.

Other objects of the invention are concerned with simplified portable equipment for certified GTA welds and include easily portable well protected flow meters and a low pressure regulator and gauge at the welding site controlled by the welder having a single source of adjustment for both torch and purge gas flows at minimized cost in an improved system in which flow rates can accurately be controlled and determined at the weld site by a scale of the coordinates anytime at a glance by the welder or supervisor. Such reduces both initial and operating costs of shielding gas and supply systems by removing from the welder's control the means required to certify each and every weld based upon the system that is under his control.

SUMMARY OF THE INVENTION

The present invention is concerned with a method and apparatus by which an inert type shielding gas such as helium or argon, is stored, distributed and supplied at an adequately substantial pressure to each GTA welder individually at a plurality of welding sites regardless of the different flow distances involved for distribution and the final pressure reduction for accurate flow is knowledgeably controlled quickly and easily by each welder who in turn is individually responsible for a certifiable welding procedure at each welding site.

IN THE DRAWINGS

FIG. 1 is a schematic diagram of a system embodying the invention.

FIG. 2 is a diagrammatic cross section of a work piece being arc welded.

FIG. 3 is a front perspective view of a unit housing for each welder in which a dual outlet fixed flow pressure regulator is concealed in it under seal.

FIG. 4 is a diagrammatical sectional view through the working parts in the housing.

DESCRIPTION OF THE INVENTION

As illustrated in FIG. 1, an argon supply tank 10, representative of a gas supply bank, is located in a protected storage space and is provided with a main supply shut off valve 16, a primary full flow pressure regulator 18 preferably set to provide pressures about 40 p.s.i.g. throughout the primary pressurized system and a moisture separator 20 at the entrance end of a rigid pipe manifold system 14 that has automatically acting plug-in outlets 22 at significant locations over a wide welding area. Thus, a volume of shielding gas is supplied with an adequate pressure by a conventional primary stage regulator 18 to a plurality of automatic plug-in gas supply site outlet valves 22 throughout the welding area. The primary pressure adjustable is high enough at the bulk supply point that the pressure of the gas and flow at the peripheral welding sites under expected full use and flow conditions of an accredited system will not drop below an adequate pressure required at any working site. This primary pressure can be adjusted in a relation safely exceeding the shielding flow requirements of the maximum number of arc welds being made at any given time.

Long, plug-in flexible conduits 24 extend from the plug-in outlets 22 to the individual welding sites, and each terminally carries a portable cabinet 26 for each welder at every active welding site. Each cabinet 26 and the control of flow provided thereby is within arms length reach and under the immediate control and adjustment by each respective welder for supplying and providing certifiably proper quantities and proportions of shielding gases required in individually making each and every one of the GTA arc welds at that site.

Structurally, the portable gas flow control cabinet 26 comprises a base 64 with skid-formed legs 66 slidable on a floor for supporting a bottom member 68 upon which is protectively mounted a low pressure regulator 28, preferably adjustable by an inspector, or the individual welder to deliver any pressure selected, and protected completely against tampering when a cover housing 27 is secured and sealed in place by an inspector with a frangible seal 25. The regulator 28 preferably carries an output pressure gauge 70 continuously readable through a shatterproof front window 72 behind which two flow meters 34 are also readily visible, having conical, graduated passages through which gas flow conventionally lifts a ball 76 in each tapered sight glass 78 for continuous flow rate readings.

The gauge pressure being determined, the outflow of the regulator 28 is bifurcated by a Y-shaped manifold 30 to flow in two streams (FIG. 4) through outlet conduits 32A and 32B, respectively. Downstream from the flow meters, accessible needle valves 36A and 36B, controllable by the welder, are provided to establish and control the desired relative flow volumes of shielding gas that are then conducted through short flexible hoses 38A and 38B to work piece 42, with appropriate gas flow volumes to provide an electric arc weld certifiable within close limits regardless of the supply distance from the stored gas 10.

With the readings of the pressure gauge 70 and the flow meters 34 known, the volumes of shielding gas flowing through the respective flexible hoses 38 can be determined according to a conventional formula or a chart curve and adjusted to provide assuredly a proper shielding for the respective sides of a weld.

The GTA welding torch 50 has a gas flow nozzle 51 which directs the flow of gas from the hose 38A to shield one side of a weld being made while suitable means is provided for the gas flow through hose 38B to purge the other side of the weld between removable dams 53 of paper type stuffing.

For example, and referring now to FIG. 2, a gas shielded welding operation is illustrated where two end abutting metal pipe sections 42A and 42B are being joined by GTA welding in which metal in the composite external groove 44 at the joint 52 being supplied with the weld metal 46 from a GTA welding rod 48 carried by a Gas Tungsten Arc Welding (GTAW) torch 50 is electrically powered from an electric power cable 54 as shielded by an argon atmosphere supplied through the two argon gas hoses 38. Hose 38A supplies the shielding gas through the torch body progressively in the groove 53 of the joint around the arc, and the hose 38B provides the "purge" or "back-up" gas by introducing argon gas to a temporary inlet hose 62 through temporarily sealed relationship.

To protect the regulator adjustment against tampering a permanent rear wall 69 carried by the removable housing 80 at the back of the cabinet 26 preferably isolates the regulator space from the front except when the housing integrally associated with the back wall is removed as a unit from the base obviously breaks a seal 25 indicating possible tampering. Otherwise, the visible output pressure gauge 70 can confirm or be relied upon separately or in combination with the respective meter flow gauges 34 to assure that proper amounts and proportions of shielding gas are supplied to the opposite sides of each and every weld 40 whether they are alike or different in their requirements.

A handle 84, large enough to receive a gloved hand is provided for ready and easy portability and handling of the unit.

CONCLUSION

Accordingly with the present invention the adjustable ratio proportioning of a variably pressurized flow of gases for shielding and purging is accomplished by a quickly adjusted, accurately performing, ruggedly constructed, portable gas flow, pressure control, dispensing cabinet that preferably is located at the end of each pressure supply hose at a welding site and is light enough and equipped to be carried by a welder anywhere to utilize at least two low pressure, metered flow, outlets for shielding and purging atmospheres in close proximity to an arc weld requiring a GTA shielding gas, such as argon, in critical relations.

A substantial range of vaiable proportions of the gas supplied at gauge pressure to various welding sites and at varying flow rates is provided by a reduction to a single mesne constant pressure within an appreciable positive pressure range and then in accordance with a prepared pressure chart formulation the volume of flow at any given time can be adjusted by needle valves at the outputs of flow meters to a desired volume flow rate to provide the exact ratio and flow rate desired for certified welds. Furthermore, not all flow rates are the same at a given pressure for shielding a range of different welding conditions, yet the invention can be used for all by mere adjustment of the shielding gas flow at a given positive comparatively low pressure.

Thus, shielding is maintained in conduit system at a pressure high enough to supply adequate volume above a predetermined adequate pressure or pressures required at one or more welding sites using it as a shielding gas for arc welding for each welder provided with a portable security-protected low differential regulator of high accuracy and an easily set, visible flow meter, under his personal control for accuracy in providing a certifiable shielding gas volume at that welding site.

This isolates individual responsibility for poor welds as related to equipment directly controlled by each welder. The flow meter is graduated for relative adjustment of flow at an unchanging pressure and the regulator is protected from access without an obvious breaking of an inspector's seal. This continuously assures no tampering if the seal is unbroken. Then the ultimate responsibility is that of the welder if misused, or as used with the seal obviously broken without rechecking the instrumentation.

What is claimed is:

1. In a GTA welding system including a source of arc weld shielding gas at a controlled distribution pressure above a predetermined working pressure and an elongated single conduit connected for supplying said arc weld shielding gas at a said controlled distribution pressure from said source, a portable cabinet including a bottom wall, a top wall, a backwall and two sidewalls having an open front side opposite said backwall, said sidewalls, backwall and topwall being joined to form an integral unit removably secured to said bottom wall forming an enclosure, a pressure reducing regulator means mounted in said enclosure and connected to said single conduit to receive arc weld shielding gas therefrom and operative to reduce the pressure of said gas to said predetermined working pressure, said pressure reducing regulator means providing shielding gas at the predetermined working pressure at two outlets, first and second adjustable flow metering means mounted within said enclosure between said pressure reducing regulator means and the open front side of said enclosure and each connected to receive shielding gas at said predetermined working pressure from one of said outlets, each said first and second adjustable flow metering means including an outlet port positioned for access from the open front side of said enclosure, a rate of flow control valve means operative to vary the rate of flow of the shielding gas between said outlet and said outlet port, control means positioned adjacent the front open side of said enclosure and manually accessible therethrough from the exterior of said enclosure for controlling said rate of flow control valve means, said flow metering means being positioned to block access to said pressure reducing regulator means unless said enclosure is opened, and a flexible shielding gas supply conduit connected to each of said outlet ports to extend from the open front side of said enclosure, one of said shielding gas supply conduits being connected to a welding torch.

2. The combination according to claim 1, wherein said source of arc weld shielding gas includes pressure regulator means operative to provide shielding gas at a distribution pressure of sufficient volume to simultaneously serve a plurality of welding sites at said predetermined working pressure, and distribution manifold means connected to receive shielding gas from said pressure regulator means, said distribution manifold means having a plurality of conduit outlet means, each for supplying an elongated single conduit connected to one of said portable cabinets.

3. A readily portable, security protected, fixed pressure shielding gas output regulator for use at a welding site remote from a source of shielding gas comprising a portable cabinet including a bottom wall, a top wall, two sidewalls and a back wall forming an enclosure having an open front side, said sidewalls, backwall and topwall being joined to form an integral unit removably secured to said bottom wall, a pressure reducing regulator means mounted in said enclosure adjacent the back wall thereof and having an inlet for receiving shielding gas from a supply conduit, said pressure reducing regulator means operating to supply shielding gas at a predetermined working pressure to first and second outlets thereof, and first and second adjustable flow metering means mounted within said enclosure between said pressure reducing means and the open front side of said enclosure and each connected to receive shielding gas at said predetermined working pressure from one of said outlets, each said first and second flow metering means including an outlet port positioned for access from the open front of said enclosure, a rate of flow control valve means operative to vary the rate of flow of the shielding gas to said outlet port, control means for each said rate of flow control valve means manually accessible from the exterior of said enclosure through the open front side thereof, and flow indicator means connected to each of said first and second flow metering means and operating to indicate the rate of gas flow through said flow control valve means, said flow indicator means being positioned for visual observation through the open front side of said enclosure, and first and second flow metering means being positioned to block access to said pressure reducing regulator means from the open front side of said enclosure.

4. The shielding gas output regulator of claim 3, wherein a protective window pane is secured between said cabinet sidewalls to extend across said open front side of said enclosure above said control means.

5. The shielding gas output regulator of claim 4, wherein an output pressure gauge means is connected to said pressure reducing regulator means to indicate the pressure of the gas supplied at said first and second outlets, said output pressure gauge means and said flow indicator means being positioned for observation through said protective window pane.

6. The shielding gas output regulator of claim 5, wherein said pressure reducing regulator means includes a manually adjustable pressure control regulator valve and a manifold connected to receive gas from said valve, said manifold having "Y" shaped passages therein to connect gas from said pressure control regulator valve to said first and second outlets, said first and second outlets being formed in said manifold.

7. The shielding gas output regulator of claim 6, wherein the outlet port for each of the flow control valve means of said first and second flow metering means is positioned below the control means for said rate of flow control valve means, said control means and outlet ports being positioned below said protective window pane for access through the open front side of said enclosure.

8. The shielding gas output regulator of claim 7, wherein skid legs are mounted on the bottom wall of said cabinet, said skid legs extending in parallel spaced relationship to each other and to the sidewalls of said cabinet.

* * * * *